Oct. 10, 1933.  C. J. COBERLY ET AL  1,929,914
MAGNETIC BRAKE
Filed Feb. 4, 1930   2 Sheets-Sheet 1
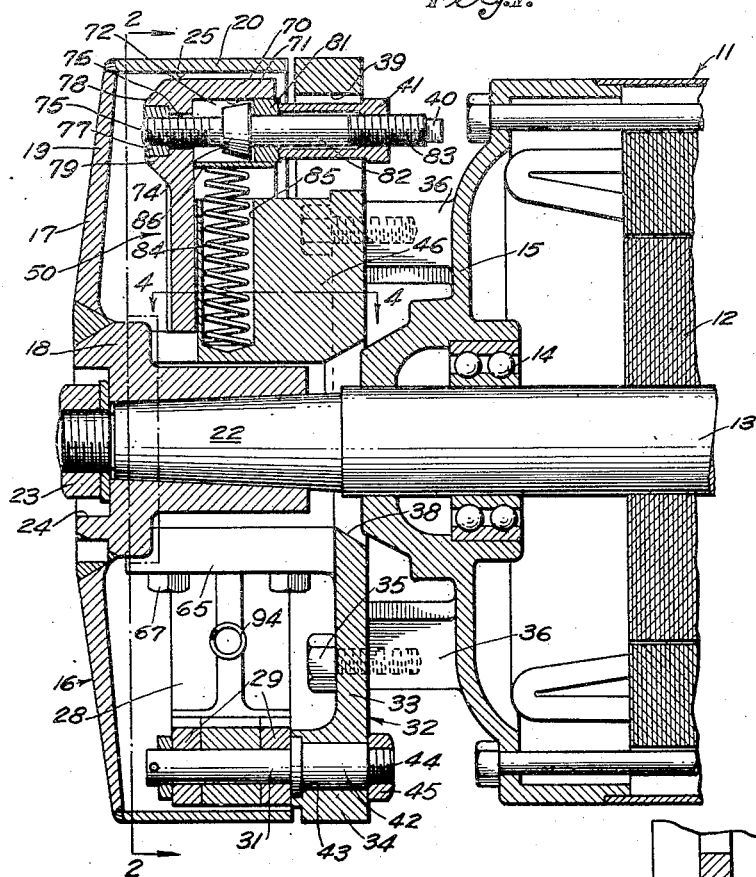
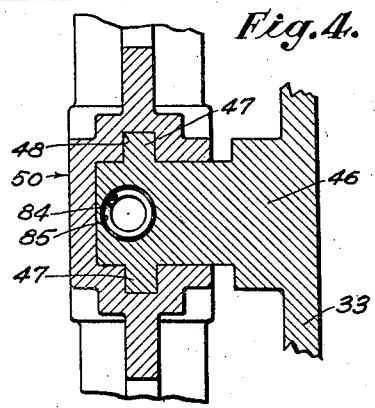
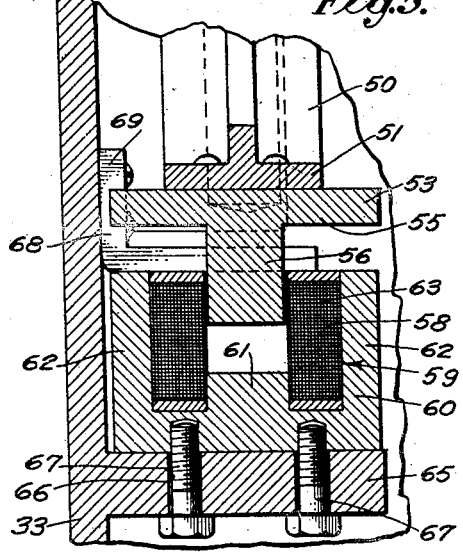
INVENTORS:
CLARENCE J. COBERLY,
ERNEST S. CROASDALE,
BY
ATTORNEY.

Oct. 10, 1933.     C. J. COBERLY ET AL     1,929,914
MAGNETIC BRAKE
Filed Feb. 4, 1930     2 Sheets-Sheet 2
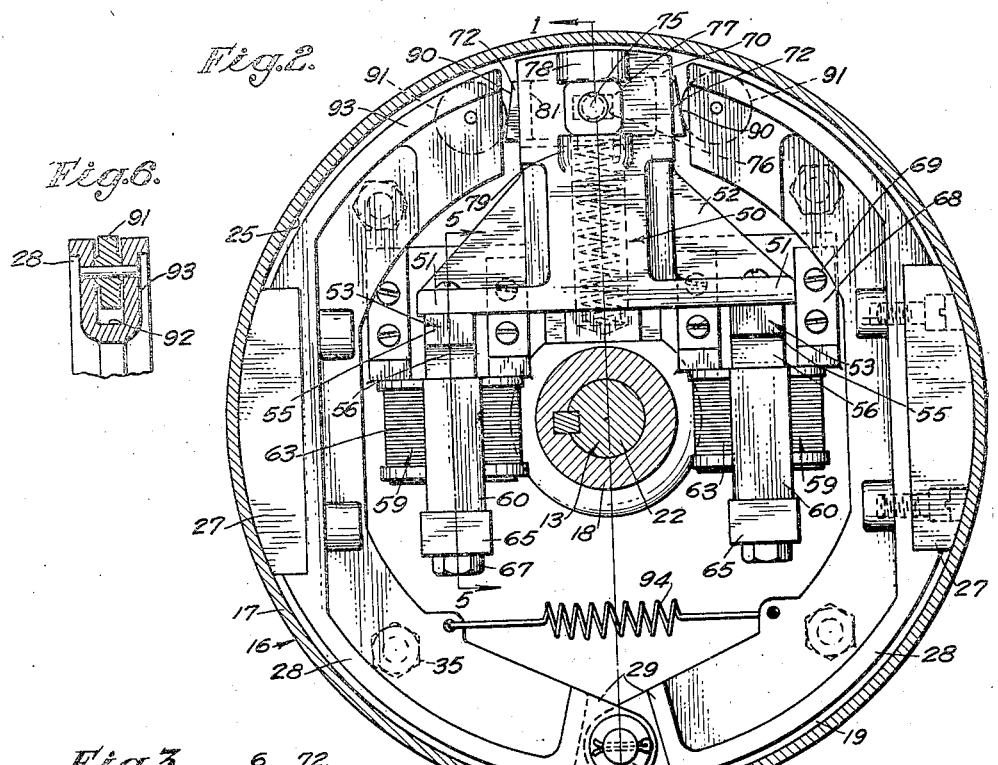
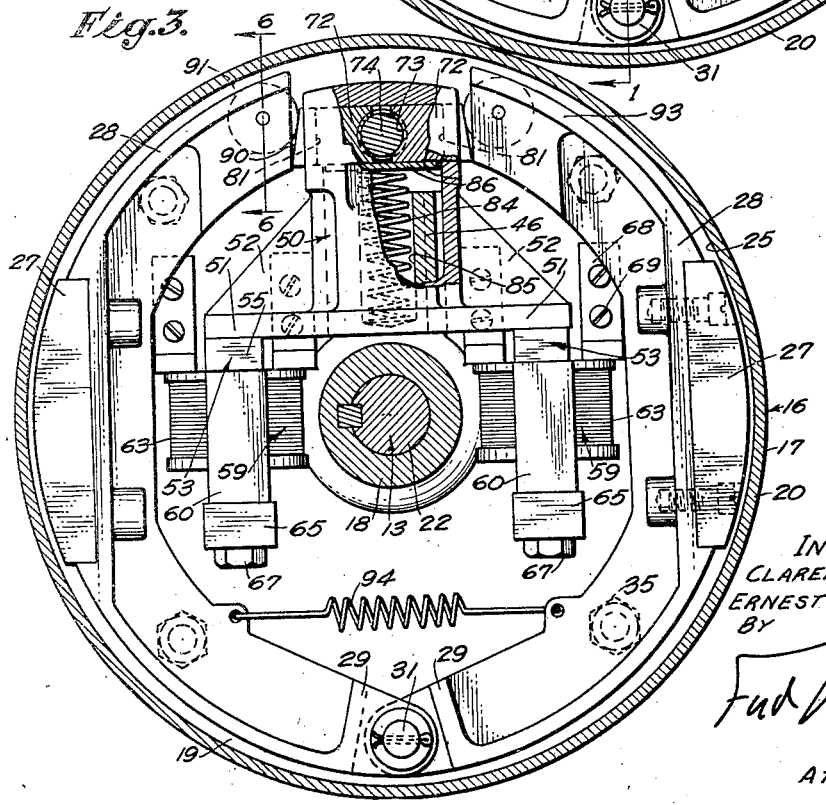
INVENTORS;
CLARENCE J. COBERLY,
ERNEST S. CROASDALE,
BY
ATTORNEY.

Patented Oct. 10, 1933

1,929,914

UNITED STATES PATENT OFFICE 1,929,914

MAGNETIC BRAKE

Clarence J. Coberly and Ernest S. Croasdale, Huntington Park, Calif., assignors to Kobe, Inc., Huntington Park, Calif., a corporation of California Application February 4, 1930. Serial No. 425,842

6 Claims. (Cl. 188—171)

This invention relates to braking equipment adapted to quickly or instantaneously bring to a stop moving parts of machines, and relates particularly to an electromagnetically operated brake device which may be used to automatically stop electrically driven parts when the current for accomplishing the driving of such parts is turned off.

The invention has extensive utility in that it may be used with any motor by which machinery and apparatus are driven, thereby making it possible to quickly, and in most cases instantaneously, stop a motor and the device to which the motor is operatively attached. The use of an automatic stopping or brake device of this character very greatly increases the safety with which machinery may be operated, as by its use a machine may be quickly brought to a stop in the event of danger, trouble, or difficulty. Other uses of the invention are with elevator drive motors and motors used for indexing purposes on automatic machines.

It is an object of the invention to provide an electrically operated brake in which the brake actuating mechanism is entirely enclosed within the drum of the brake equipment.

A further object of the invention is to provide an automatic brake for stopping a rotatable member, in which the automatically actuated mechanism of the brake is disposed within the brake drum thereof.

A further object of the invention is to provide an electrically operated brake in which the braking pressure is applied in a positive manner and by the use of simple and durable cooperating parts.

A further object of the invention is to provide an electrically actuated automatic brake having a hollow casing equipped with an internal cylindrical frictional surface and shoes mounted within the casing in position to engage the cylindrical frictional surface of the casing, a cam or wedge member adapted for movement by a spring in such direction that the cam will spread the brake shoes apart and force them pressurably into engagement with the frictional surface of the casing, and a simple and compact electromagnetic means for moving the cam member in a negative direction whereby to remove the cam member from engagement with the brake shoes, thereby permitting the brake shoes to relatively collapse and move from engagement with the braking surface of the casing.

Further objects and advantages of the invention relate to the provision of a simple and efficient combination of mechanical parts embodying the invention, as disclosed in the following part of the specification and illustrated in the accompanying drawings in which, Fig. 1 is a vertical cross sectional view on a plane indicated by the line 1—1 of Fig. 2, showing an embodiment of our invention mounted on a motor shaft which projects from the end of a motor.

Fig. 2 is a vertical cross section taken on the line 2—2 of Fig. 1, this view showing the brake in operated position, Fig. 3 is a partly sectioned view similar to Fig. 2, showing the brake in non-operated position.

Fig. 4 is an enlarged fragmentary view on a plane represented by the line 4—4 of Fig. 1.

Fig. 5 is an enlarged fragmentary sectional view on a plane represented by the line 5—5 of Fig. 2.

Fig. 6 is a fragmentary view taken in section as indicated by the line 6—6 of Fig. 3.

In Fig. 1 we show a motor 11 having a rotor 12 mounted on a shaft 13 which extends outwardly through a bearing 14 carried in a cover plate or end bell 15 of the motor 11. Our new electrically operated brake is shown in a position to control rotation of the shaft 13. This brake 16 includes a cup shaped shell 17 having a hub 18, a radial web 19, and a cylindrical band 20, thus forming a cup shaped brake drum. The hub 18 of the casing or drum 17 is bored at a taper so as to fit tightly on the tapered end 22 of the rotating member or shaft 13, this drum 17 being secured against removal by a nut 23 which threads onto the shaft 13 and preferably rests within a recess 24 in the end of the hub 18. The inner cylindrical face 25 of the cylindrical wall 20 forming part of the drum 17 constitutes a frictional surface adapted to be frictionally engaged by frictional members 27 carried by brake shoes 28, as shown in Figs. 2 and 3. The brake shoes 28 are in the form of segments which are nearly semi-circular, their lower ends 29 being pivoted on a hinge pin 31 which projects from the lower portion of a supporting member 32. The supporting member 32 has substantially the form of a circular plate or wall 33 with a rim or flange 34 extending around the periphery thereof, the supporting member 32 being secured in stationary position adjacent to the rightward or open end of the drum 17 by means of cap screws 35 which extend through the wall 33 into supporting lugs 36 which project outwardly from the cover plate 15 of the motor 11. The supporting member 32 has a central opening 38 through which the shaft 13 extends and has a smaller opening 39 near its upper edge through which an adjusting screw 40 and a locking sleeve 41 may extend to an accessible position. The hinge pin 31 has an enlarged supporting end 42 which is received in an opening 43 in the lower portion of the member 32 and in a position substantially diametrically opposite the upper opening 39, the pin 31 having a threaded projection 44 on which a nut 45 may be screwed for the purpose of holding the pin tightly in operative position relative to the supporting member 32. Above the opening 38 of the member 32, a vertical slide 46 projects into the interior of the drum 20, this slide 46, as shown in Fig. 4, having projecting ribs 47 which extend in vertical direction and engage vertical slots 48 in a cam member 50, thus enabling the cam member 50 to slide vertically on the slide member 46.

As best shown in Figs. 2 and 3, the cam member 50 has oppositely extending horizontal webs 51 suitably reinforced by gussets 52, these extending webs 51 of the cam member 50 having armatures 53 secured to the lower faces thereof. The armatures 53 each consist of a horizontal bar portion 55 of relatively small cross section, as may be perceived from the end views thereof in Fig. 2, and a downwardly extending plug portion 56, as best shown in Fig. 5, the plug portion 56 of each armature 53 extending down into the central opening 58 of a solenoid type of electromagnet 59. The electromagnets 59 each consist of a field 60 having a central core portion 61 and outer leg portions 62, the core portions 61 extending upwardly into the central opening 58 and the side portions 62 extending upwardly in front and back of the solenoid winding 63.

The electromagnetic members 59 are held in their operating positions on opposite sides of the opening 38 through which the shaft 13 extends by means of brackets 65 which project outwardly from the plate 33 of the member 32 and are drilled as indicated at 66 in Fig. 5 to receive cap screws 67 which thread into the lower portions of the field members 60, and by means of small brackets or clips 68 which are secured to the plate 33 of the member 32 by screws 69, there being a pair of such clips 68 for each electromagnet 59, each pair being positioned so as to engage the upper portion of the winding 63 on opposite sides of the opening 58 thereof and likewise on opposite sides of the respective armatures 53.

The upper end 70 of the cam member 50 has a lateral slot 71 which faces rightwardly, as shown in Fig. 1, toward the inner surface of the stationary supporting member 32. In this slot 71 a pair of adjustable bars 72 is placed, as shown in Figs. 1, 2, and 3. The inner ends of the bars 72 are conically grooved, as indicated at 73 in Fig. 3, to receive the frusto-conical flange or body portion 74 of the adjustment screw 40 which has a forwardly projecting threaded end 75 which extends through a laterally elongated slot 76 in the wall of the cam member 50 into threaded engagement with a nut 77 confined between upper and lower lugs 78 and 79 in such a manner that this nut 77 cannot rotate but is horizontally slidable between the lugs or projections 78 and 79.

A flat bar 81, as indicated in cross section in Fig. 1 and by dotted lines in Fig. 3, extends across the rightward faces of the bars 72 and is centrally drilled so that the shank 82 of the adjustment member 40 may extend rightwardly through the opening 39 in the upper portion of the stationary supporting member 32. The locking sleeve 41 is internally threaded near its outer end so that it may be screwed onto the threads 83 cut near the rightward extremity of the adjustment member 40. The leftward end of the locking sleeve 41 is adapted to be screwed tightly against the bar 81 so as to clamp the adjustable bars 72 tightly in the lateral slot 71 of the cam member 50. The tension exerted by the locking sleeve 41 on the shank 82 of the adjustment member 40 is received by the nut 77 which threads onto the leftward end 75 of the member 40. The bars 72 may be spread apart by first loosening the locking nut 41 and then rotating the adjustment member 40 so as to cause it to advance leftwardly through the nut 77, thus causing the conical wedge portion 74 thereof to move leftwardly between the inner ends of the adjustable bars 72, with the result of forcing them outwardly. In a like manner, the conical wedge 74 may be moved in a rightward direction so as to permit the adjustable bars 72 to be moved inwardly in the lateral slot 71. A compression spring 84 which rests in a vertical cavity 85 in the slide member 46 exerts an upward pressure against a spacer plate 86 which rests against the under faces of the adjustable bars 72, as shown in Figs. 1 and 3, with the result that the cam member 50 is normally held in raised or outward position so that the converging faces 90 formed at the outer ends of the adjustable bars 72 will force outwardly against rollers 91 carried in slots 92 at the upper ends 93 of the shoes or segments 28, as shown in Fig. 2, thus forcing the upper ends of the shoes 28 outwardly and causing the members 27 to frictionally engage the internal cylindrical frictional surface 25 of the casing or drum 16. When the windings 63 of the electromagnets 59 are energized, the cam member 50 will be drawn down from the position in which it is shown in Fig. 1 into the position of Fig. 3, as a result of attraction of the armatures 53 by the electromagnets 59, the sloping or cam faces 90 of the adjustable bars 72 moving downwardly relative to the rollers 91 and permitting the brake shoes 28 to be moved inwardly by an interconnecting spring 94, thus releasing the members 27 from frictional engagement with the drum 16.

All of the cooperating parts of this electrically operated brake are mounted compactly within the brake drum, but the mechanism may be readily adjusted without dismantling the brake equipment by manipulation of the adjustment screw 40 and the locking sleeve 41, as previously described. In addition to this, should the necessity arise for replacing the wear blocks represented by the frictional members 27, the drum or casing 16 may be readily removed from the end of the shaft 13 without disturbing other parts of the brake mechanism.

It will be noted that the rightward end 75 of the adjustment member 40 projects through a laterally elongated slot 76 and that the nut 77 is also laterally movable between the lugs 78 and 79, this making it possible to move the adjustment member 40 laterally in either direction so as to centralize the sloping or cam faces 90 of the adjustable bars 72 relative to the brake segments or shoes 28. The extremely low angle of slope of the cam faces 90 on the ends of the adjustable bars 72 produces a very large spreading force between the upper ends of the brake shoes 28, this resulting in a very quick braking action.

In the embodiment of the invention shown we have adapted the electrical parts to release the brake, but it will be recognized that by rearrangement of the parts, the brake may be electrically applied. In the form of the invention herein illustrated, the electromagnets 59 may be connected in circuit with the motor driving the shaft or other movable part to which the brake is attached, so that when the electric current is turned on so as to drive the motor, the automatic brake will at the same time be released, and when the power to the motor is turned off, the spring 84 will automatically operate the brake mechanism and immediately or instantaneously stop rotation of the parts to which it is attached.

Although we have herein shown and described a simple and practical embodiment of our invention, it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope of the following claims.

We claim as our invention:

1. A brake mechanism of the character described, including: a brake drum having an internal cylindrical friction surface; a supporting member adjacent to the open end of said brake drum; brake shoes movably mounted on said supporting member and within said brake drum, said brake shoes having ends lying adjacent one to another; cam means adapted to spread said ends so as to force said brake shoes into engagement with said frictional surface of said brake drum; a slide member on the inner face of said supporting member for movably supporting said cam means; means for exerting on said cam means a pressure tending to move said cam means in a positive direction so as to force said brake shoes into engagement with said frictional surface of said brake drum; an armature on said cam means; and electromagnetic means mounted on said supporting plate within said brake drum for attracting said armature and moving said cam means in negative direction so as to release said brake shoes.

2. A brake mechanism of the character described, including: a brake drum adapted to be secured to a shaft, said brake drum having an internal cylindrical friction surface and one end thereof open; a supporting member surrounding said shaft in a position adjacent to the open end of said brake drum; brake shoes movably mounted on said supporting member within said brake drum, said brake shoes having cooperating adjacent ends; cam means adapted to spread said ends so as to force said brake shoes into engagement with said frictional surface of said brake drum; a radial slide member on the inner face of said supporting member for slidably holding said cam means; a spring tending to move said cam means in outward direction so as to force said brake shoes into engagement with said frictional surface of said brake drum; a pair of armatures on said cam means, said armatures being spaced apart; and a pair of electromagnets supported on the inner face of said supporting member, said electromagnets being positioned on opposite sides of said shaft and being adapted to attract said armatures so as to move said cam means in inward direction to accomplish release of said brake shoes.

3. A brake mechanism of the character described, including: a brake drum having an internal cylindrical friction surface; a supporting member adjacent to the open end of said brake drum; brake shoes movably mounted on said supporting member and within said brake drum, said brake shoes having ends lying adjacent one to another; actuating means adapted to spread said ends so as to force said brake shoes into engagement with said frictional surface of said brake drum; a slide member on the inner face of said supporting member for movably supporting said actuating means; means for exerting on said actuating means a pressure tending to move said actuating means in a positive direction so as to force said brake shoes into engagement with said frictional surface of said brake drum; an armature on said actuating means; and electromagnetic means mounted on said supporting plate within said brake drum for attracting said armature and moving said actuating means in negative direction so as to release said brake shoes.

4. A brake mechanism of the character described, including: a brake drum adapted to be secured to a shaft, said brake drum having an internal cylindrical friction surface and one end thereof open; a supporting member surrounding said shaft in a position adjacent to the open end of said brake drum; brake shoes movably mounted on said supporting member within said brake drum, said brake shoes having cooperating adjacent ends; actuating means adapted to spread said ends so as to force said brake shoes into engagement with said frictional surface of said brake drum; a radial slide member on the inner face of said supporting member for slidably holding said actuating means; a spring tending to move said actuating means in outward direction so as to force said brake shoes into engagement with said frictional surface of said brake drum; a pair of armatures on said actuating means, said armatures being spaced apart; and a pair of electromagnets supported on the inner face of said supporting member, said electromagnets being positioned on opposite sides of said shaft and being adapted to attract said armatures so as to move said actuating means in inward direction to accomplish release of said brake shoes.

5. A brake construction of the class described, including: a brake drum; a supporting structure extending into said brake drum; a pair of brake bands in said brake drum, being supported in place by said supporting structure, said pair of brake bands having free ends positioned adjacent each other; a cam member in said brake drum and supported by said supporting structure for outward and inward movement; a pair of cam bars carried by said cam members, said cam bars being prepared at their outer ends for engagement with the free ends of said pair of brake bands; operating mechanism for said cam members whereby said cam bars are caused to actuate said brake bands; and means for adjusting the positions of said cam bars relative to said cam member, including an adjusting member projecting outwardly from within said brake drum and having its outer end prepared for engagement.

6. A brake construction of the class described, including: a brake drum; a supporting structure extending into said brake drum; a pair of brake bands in said brake drum, being supported in place by said supporting structure, said pair of brake bands having free ends positioned adjacent each other; a cam member in said brake drum and supported by said supporting structure for outward and inward movement; a pair of cam bars carried by said cam members, said cam bars being prepared at their outer ends for engagement with the free ends of said pair of brake bands; operating mechanism for said cam members whereby said cam bars are caused to actuate said brake bands; and means for adjusting the positions of said cam bars relative to said cam member, including an adjusting member projecting outwardly from within said brake drum and having its outer end prepared for engagement, and including a lock means for said adjusting means which also etxends to the exterior of said brake drum.

CLARENCE J. COBERLY,
ERNEST S. CROASDALE.